United States Patent [19]

Finch

[11] Patent Number: 5,809,612
[45] Date of Patent: Sep. 22, 1998

[54] ANTI-SHIMMY CASTER WHEEL MOUNTING

[75] Inventor: Thomas E. Finch, Spring Branch, Tex.

[73] Assignee: TEFTEC Corporation, Spring Branch, Tex.

[21] Appl. No.: 582,188

[22] Filed: Jan. 2, 1996

[51] Int. Cl.[6] .................................................. B60B 33/00
[52] U.S. Cl. .............................................. 16/35 D; 16/21
[58] Field of Search .............................. 16/20, 21, 18 R,
16/22, 23, 48, 35 D, 337, 342

[56] References Cited

U.S. PATENT DOCUMENTS

| | | | |
|---|---|---|---|
| 1,826,821 | 10/1931 | Powers | 16/21 |
| 2,103,202 | 12/1937 | Green | 16/21 |
| 2,369,609 | 2/1945 | Sandberg | 16/21 |
| 4,432,116 | 2/1984 | Schultz | 16/35 D |
| 4,620,342 | 11/1986 | Haussels | 16/18 R |
| 5,390,393 | 2/1995 | Reppert et al. | 16/21 |

FOREIGN PATENT DOCUMENTS

| | | | |
|---|---|---|---|
| 944293 | 6/1956 | Germany | 16/342 |
| 3029243 | 3/1982 | Germany | 16/337 |

*Primary Examiner*—Chuck Mah
*Assistant Examiner*—Donald M. Gurley
*Attorney, Agent, or Firm*—Cox & Smith Incorporated

[57] ABSTRACT

A assemblage for mounting a caster wheel on a depending stationary post on a wheeled load carrier comprises a body element having a cylindrical chamber concentrically surrounding the support post. The body element has a bracket for mounting a caster wheel for rotation about a horizontal axis. A vertical stack of washers surround the support post and alternate ones of such washers are secured to the support post and rotatable within the cylindrical chamber while the remainder of such washers are co-rotatable with the body element about the axis of the support post. The cylindrical chamber is filled with a lubricating fluid to a sufficient depth to cover all abutting surfaces of said washers, thereby providing viscous fluid shearing resistance to shimmying movement of the caster wheel relative to the support post. To maintain the friction between the support post and body element independent of the amount of load, anti-friction thrust bearings are provided between the support post and the body element.

16 Claims, 4 Drawing Sheets

ANTI-SHIMMY CASTER WHEEL MOUNTING

FIELD OF THE INVENTION

The invention relates to the mounting of a caster wheel to the frame of a wheeled load carrier to eliminate shimmying movements of the caster wheel without imposing any significant restraint on the turnability of the wheel for steering of the wheeled load carrier.

BACKGROUND OF THE INVENTION

Caster wheels have long been employed for a large variety of wheel load carriers. Wheeled load carriers are, for purposes of this application, defined as any load carrier which is supported by a minimum of three wheels, at least one of which is a caster wheel. A caster wheel supports a portion of the weight of the wheeled load carrier and rotates about a horizontal axis as such load carrier is moved. To permit steerability of the wheeled load carrier, the mounting of the caster wheel to the frame of the wheeled load carrier normally permits a swiveling or pivotal movement of the caster wheel in a horizontal plane. Unfortunately, this capability of pivotal movement becomes a problem when the wheeled load carrier is pushed over an uneven surface. Such uneven surface produces a horizontal lateral displacement of the caster wheel from the desired direction which displacement is then opposed by the linear movement of the wheeled carrier resulting in successive pivotal over corrections and a shimmying movement of the caster wheel which normally can only be eliminated by slowing or stopping the wheeled load carrier or pushing the carrier a substantial distance along a smooth surface.

The term "wheeled load carrier" is applicable to many well known movable vehicles such, as grocery carts, wheelchairs, gurneys, hospital beds, etc. Such vehicles may employ 1, 2 or 4 caster wheels. Many known caster wheel mountings result in a frictional resistance to horizontal turning or swiveling movement of the mounting relative to the frame due to the combined weights of the frame and the load imposed on the caster wheel mounting in a vertical direction. While this type of mounting may reduce shimmy, it makes the caster wheel very difficult to turn in a horizontal plane for effecting the steering or turning of the wheeled load carrier.

The prior art has not disclosed a caster wheel mounting which will impart a modest frictional resistance to turning movement of the caster wheel in a horizontal plane, but such frictional resistance to turning is not substantially increased through the application of a load to wheeled carrier, thus preserving its steerability.

All though not limited thereto, the present invention is of particular value when applied to a power driven wheelchair. The frame, motor, and batteries, plus the weight of the occupant, represents a substantial load to be moved, but high maneuverability of any power wheelchair is very desirable to permit the wheelchair occupant to manipulate the chair through store, residential, office, recreational and hospital environments without producing any shimmy movements of the caster wheels forming part of the wheel support of the powered wheelchair.

SUMMARY OF THE INVENTION

The caster wheel mounting embodying this invention comprises a mounting rod or post rigidly securable in depending relationship to a frame of the wheeled load carrier to which the caster wheel is to be mounted. A body element is provided having a vertical axis, cylindrical chamber which surrounds the mounting rod in concentric relation. The bottom of the cylindrical chamber is preferably solid and the top of the cylindrical chamber is open to permit the ready concentric insertion of the mounting rod in such chamber.

The lower portion of the cylindrical chamber is provided with a reduced diameter, axially extended peripheral portion. Such portion is, in turn, provided with a plurality of peripherally spaced vertical grooves. Such reduced diameter portion also provides an upwardly facing annular surface or shoulder for the mounting thereon of a first thrust bearing which is preferably of the ball bearing type.

The support rod is provided with a radially projecting annular flange on its medial portion which, when the support rod is inserted in the cylindrical chamber, is disposed above and abutting the aforementioned thrust bearing. Thus, the support post is vertically supported in the cylindrical chamber.

The portion of the support post below the radial flange is preferably of non-circular configuration, for example, may comprise a square in cross section. This non-circular configuration of support post extends downwardly through the axial length of the reduced diameter portion of the cylindrical chamber.

A plurality of washers or discs are provided, each having a central aperture through which the non-circular bottom portion of the support post passes, to form a vertical stack. Alternate ones of the vertical stack of washers are provided with non-circular cross sectional apertures co-operable with the non-circular cross section portion of the support posts, and the peripheries of these alternate washers are freely rotatable relative to the cylindrical chamber.

The remainder of the vertically stacked washers have a circular central aperture freely surrounding the non-circular cross-section of the support post, but on their peripheries are provided with a plurality of peripherally spaced radial projections. Such projections are respectively cooperable with the peripherally spaced vertical grooves provided in the reduced diameter portion of the cylindrical chamber. These washers are thus movable with the cylindrical chamber relative to the support post, which is stationary. Hence, alternate washers are stationary and the remaining washers are rotatable whenever a turning movement is imparted to the body element. The stationary washers could be described as stator discs, while the movable washers could be called rotor discs.

The body element is provided with an angularly extending bracket for mounting a caster wheel for rotation about a horizontal axis. Such bracket may be integral with the body element or may be formed as a separate structure which is then bolted to a planar surface provided on the body element.

Any conventional means may be provided for securing the support post within the cylindrical chamber. In the preferred construction, a second annular thrust bearing is mounted on the support post in abutting relationship to the top surface of the radial flange. An annular closure and locking member is then mounted on the support post abutting the second thrust bearing and is secured against axial movements relative to the body element by a C-spring which cooperates between aligned peripheral grooves respectively provided in the top wall portion of the cylindrical chamber of the body element and the periphery of the closure member.

A lubricating fluid is then supplied to fill the bottom of the cylindrical chamber to a depth covering at least all of the abutting surfaces of the vertically stacked washers. To retain such lubricating fluid within the body element, a first annular seal is provided between the external periphery of the annular closure member and the internal wall of the cylindrical chamber. A second annular seal is provided between the central aperture in the annular closure and the adjacent portion of the support post.

From the foregoing description, it will be apparent that turning movements of the body element about the support post, which are required to effect a swiveling of the caster wheel about the axis of the support post, are resisted by viscous fluid shearing forces generated between the vertically stacked washers. Such forces are, however, completely divorced from the vertical forces imposed on the support post by an anti-friction thrust bearing. Upward forces on the support post generated by the passage of a caster wheel over an obstruction, are absorbed by the second anti-friction bearing mounted between the upper surface of the support post flange and the annular closure member.

It follows that a substantially constant restraining force is imparted to oppose swiveling or turning movements of the caster wheel of a wheeled carrier to eliminate any tendency of such caster wheel to shimmy, without impairing the ability to turn by any load applied to the wheeled carrier.

Further advantages will be readily apparent to those skilled in the art from the following detailed description, taken in conjunction with the annexed sheets of drawings on which are shown two preferred embodiments of the invention.

PREFERRED EMBODIMENTS OF THE PRESENT INVENTION

Figures 1, 3:
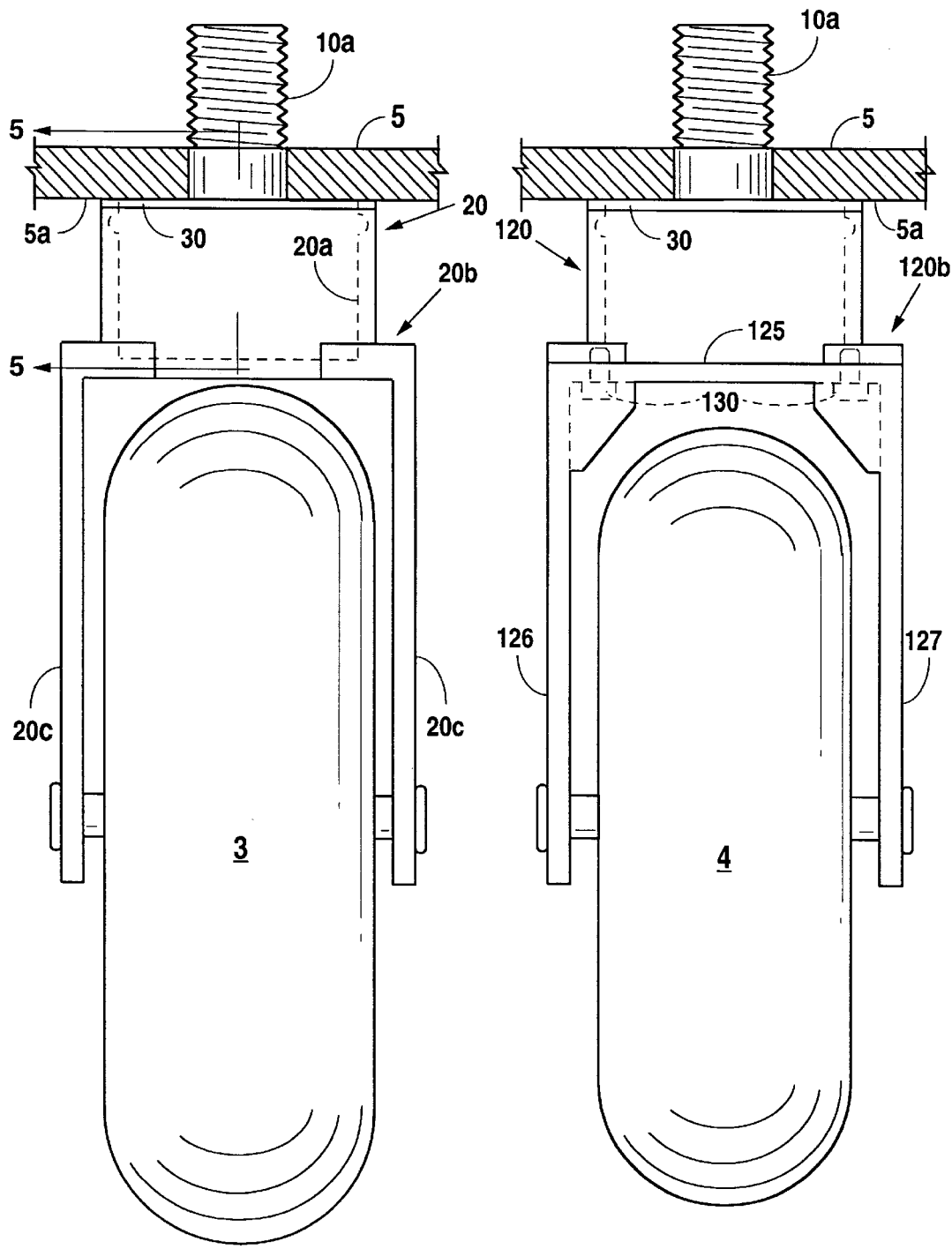
FIG. 1 is a front elevational view of the wheel mounting portion of a anti-shimmying caster wheel support embodying this invention.
FIG. 3 is a front elevational view of a modified construction of the wheel mounting portion of an anti-shimmying caster wheel support embodying this invention.
Figure 2:
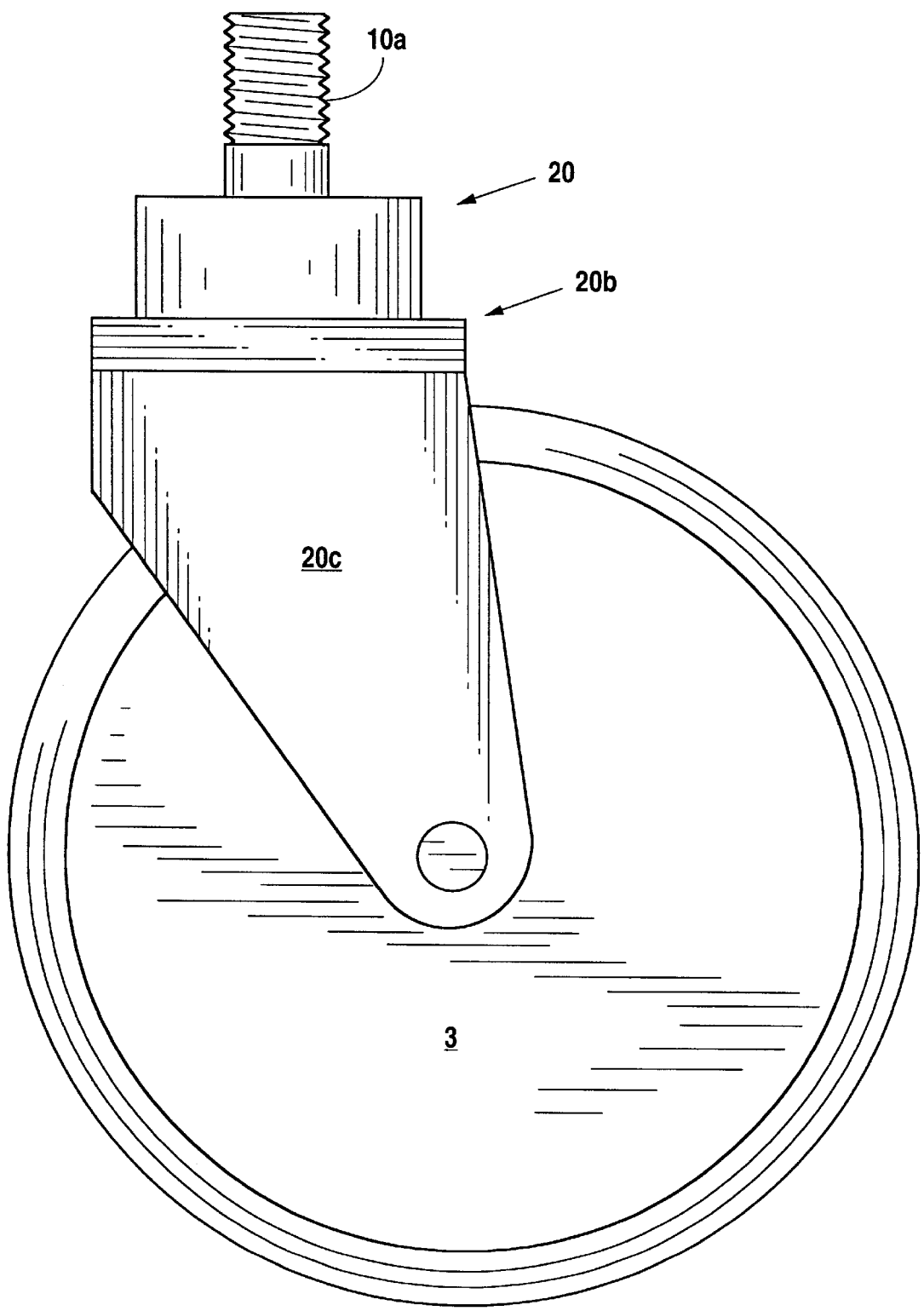
FIG. 2 is a side elevational view of FIG. 1.
Figure 4:
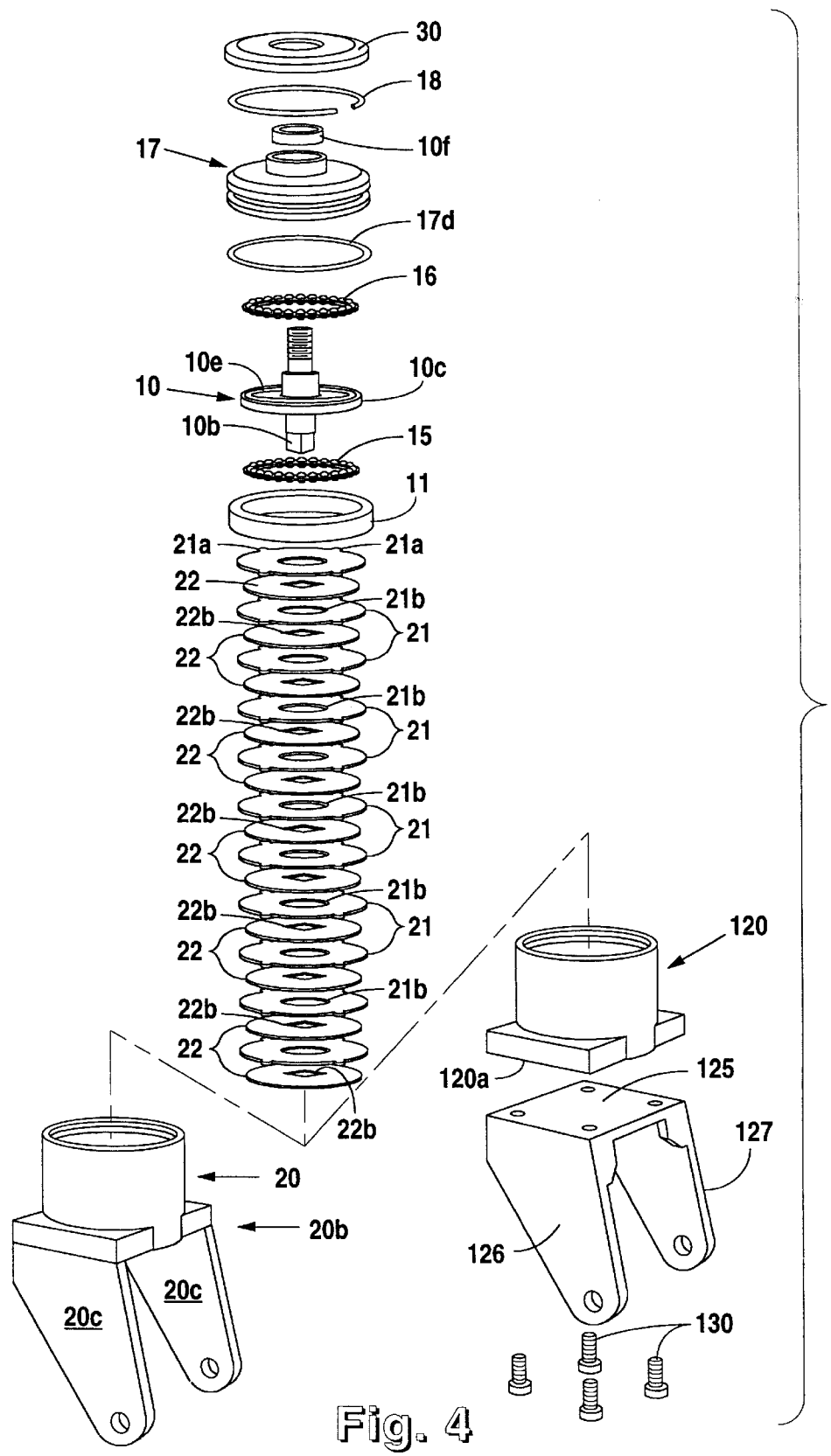
FIG. 4 is an exploded view of the mechanism incorporated within the support structures of either the embodiment of FIGS. 1 and 2 or the embodiment of FIG. 3.

Referring to the drawings, and particularly to FIGS. 1 and 2, a preferred embodiment of this invention comprises a caster wheel support rod or post 10 having a threaded top end 10a for securing support post 10 in rigid depending relation to a frame portion 5 of any conventional wheeled carrier (not shown).

Threads 10a may either be engaged in a cooperating threaded hole in frame portion 5 or alternatively, pass through a hole in such frame portion and be secured thereto by a pair of nuts (not shown).

A body element 20 is provided having an upwardly open, cylindrical chamber 20a into which the bottom end of 10b of support post 10 is concentrically mounted by means to be hereafter described that permits rotation of body element 20 about the vertical axis of the support post 10.

In one preferred embodiment, the body element has an angularly projecting bracket 20b integrally formed thereon as shown in FIGS. 1 and 3. Bracket 20b comprises horizontally spaced arms 20c that conventionally mount a caster wheel 3 for rotation about a horizontal axis. A single arm 20c could be used if desired.

Figure 5:
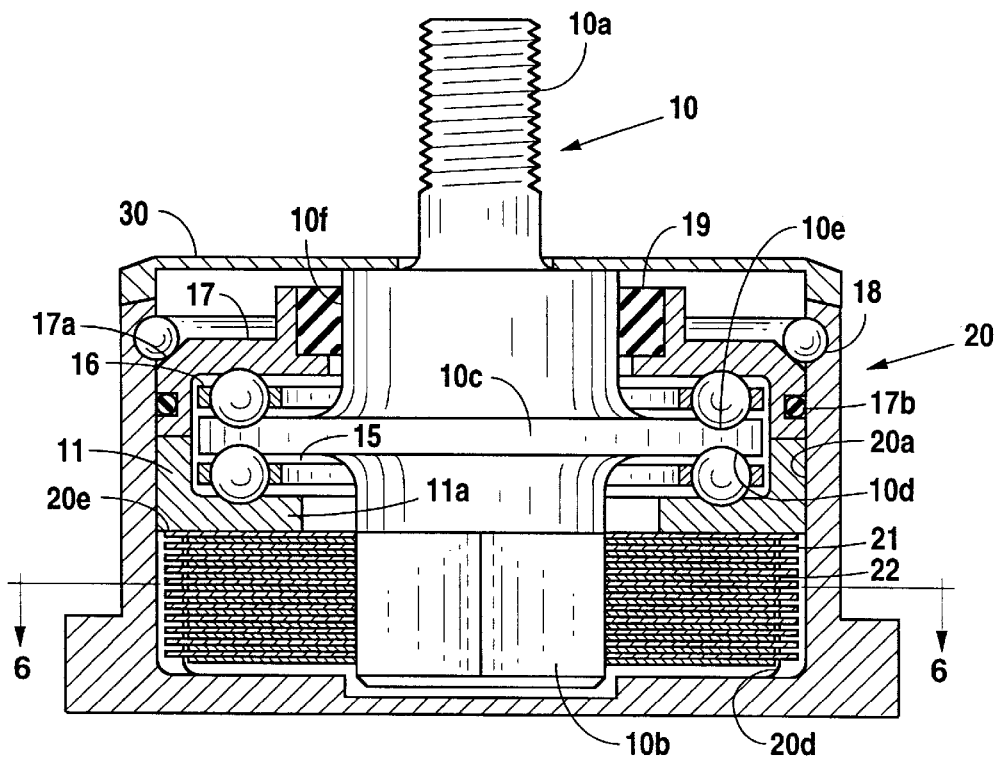
FIG. 5 is an enlarged scale sectional view taken on the plane 5—5 of FIG. 1.

In a second preferred embodiment shown in FIG. 3, the caster wheel supporting bracket is not integrally formed with the body element 120 but is a separate U-shaped member having a horizontal bight portion 125 and horizontally spaced, angularly projecting arm portions 126 and 127 which conventionally mount a caster wheel 4 of any selected diameter for rotation about a horizontal axis. Bight portion 125 is secured by bolts 130 to a horizontal planar surface 120a formed on the bottom of body element 120. This embodiment permits selection of the size of caster wheel 4 and the location of the horizontal rotational axis of such wheel relative to support post 10. Otherwise, the embodiment of FIGS. 1 and 2 and FIGS. 3 and 4 are identical as shown in FIG. 5 and the rotational mounting of the body elements 20 and 120 on their respective support posts 10 is identical, hence will only be described in connection with body element 20.

Figure 6:
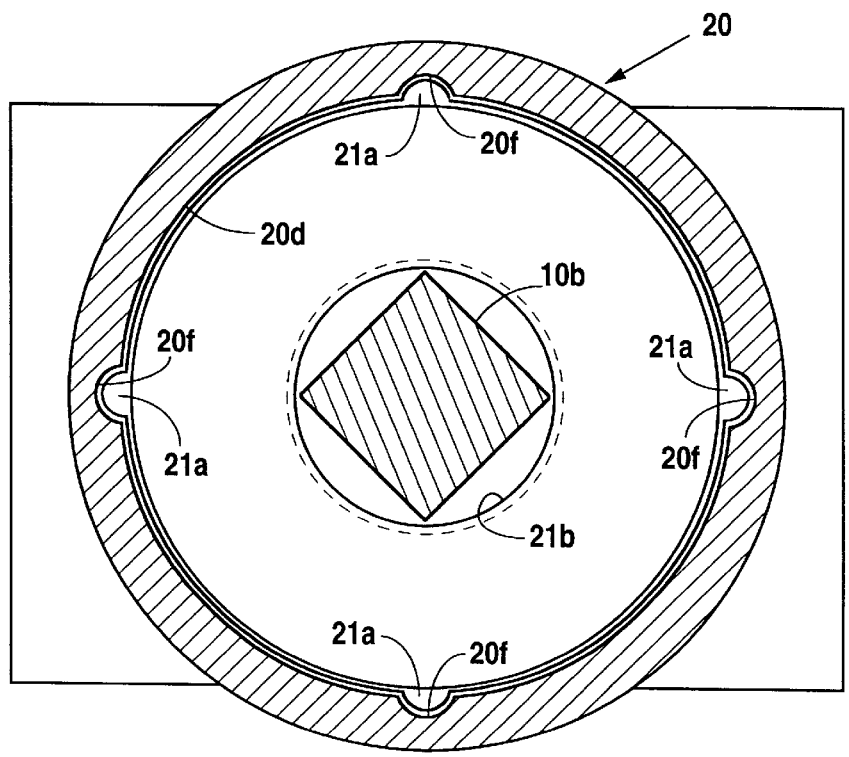
FIG. 6 is a sectional view taken on the plane 6—6 of FIG. 5.

The cylindrical chamber 20a of body element 20 is provided with a reduced diameter lower portion 20d which defines an upwardly facing annular shoulder 20e. The vertical wall of lower chamber portion 20d is provided with a plurality of peripherally spaced, vertical grooves 20f (FIG. 6).

A vertical stack of washers or discs 21 and 22 having a total height not greater than shoulder 20e of reduced diameter chamber portion 20d, is inserted in said lower chamber portion 20d. Washers 21 have a plurality of peripherally spaced radial projections 21a, respectively engagable with vertical grooves 20f. This makes washers 21 co-rotatable with body element 20. Those skilled in the art will recognize that vertical ribs may be provided on reduced diameter chamber portion 20d instead of grooves, and cooperating vertical grooves provided on the periphery of washers 21.

The vertical stack of washers is formed by alternating washers 22 between washers 21. Washers 22 have a periphery generally equal to that of washers 21, but have no radial projections to engage vertical grooves 20f of body element 20. Hence, body element 20 and washers 21 are rotatable relative to washers 22.

Both sets of washers 21 and 22 have central apertures 21b and 22b, respectively which are traversed by a non-circular end portion 10b of support post 10. Apertures 21b of washers 21 are circular and large enough to permit washers 21 to 6 freely rotate around non-circular end portion 10b of support post 10. Washers 22 have central apertures 22b conforming to the non-circular end portion 10b of support post 10, hence are restrained from any rotation about the axis of support post 10.

A lubricating fluid (not shown), such as a light oil, is supplied to chamber 20a to a depth covering all of the abutting surfaces of washers 21 and 22. Thus, any tendency of the caster wheel 3 to shimmy will be opposed by viscous fluid shearing forces between the abutting surfaces of washers 21 and 22. The total forces are dependent on the number of washers 21 and 22, hence the number of washers used is sufficient to substantially eliminate shimmying movement of the caster wheel, without, however, making the caster wheel difficult to swivel about the axis of support post 10 for steering of the wheeled carriage.

This invention also eliminates caster wheel swiveling resistance when a heavy load is imposed on the wheeled carrier.

To overcome this problem, the medial portion of the support post 10 is provided with a radially projecting, annular flange 10c. Prior to insertion of support post 10 into cylindrical chamber 20a, an L-shaped annular support 11 is inserted in cylindrical chamber 20a and abuts upwardly facing shoulder 20e. A conventional annular ball bearing assembly 15 is inserted in the open top cylindrical chamber 20a and abuts the horizontal flange 11a of L-shaped annular support 11. The lower side of post flange 10c then abuts the balls in bearing assembly 15. This prevents any compressive force being applied to the stack of washers 21 and 22 by the load on the support post 10. The bottom of support post 10 is spaced above the bottom of cylindrical chamber 10a, hence downward thrust forces are transmitted to body element 20 solely by the ball bearing assembly.

If minimum friction to turning movement of body element 20 and the attached caster wheel 3 is desired, a second conventional annular ball bearing assembly 16 is inserted around the support post 10 with the balls of bearing assembly 16 abutting the top surface of the support post flange 10c. If desired, annular grooves 10d and 10e may be respectively provided in the top and bottom surfaces of support post flange 10c to respectively engage the balls in ball bearing units 15 and 16. This prevents tilting of the axis of rotation of body element 20 about support post 10.

To lock support post 10 and bearing units 15 and 16 within the bottom cylindrical chamber 20a of body element 20, an annular locking member 17 is provided which overlies and abuts the top bearing unit 16. An annular groove 20g is provided in the top wall portion of the cylindrical chamber 20a and an aligned groove 17a is provided on locking element 17. A C-ring spring 18 is then forced into grooves 20g and 12a to securely lock annular locking member 17 within the cylindrical chamber 20a of body element 20. Obviously, other conventional fastening means may be utilized instead of the C-ring spring 18. In any event, the annular locking member 17, the ball bearing assemblies 15 and 16, the annular support 11, and the upwardly facing annular shoulder 20e cooperate with the radial flange 10c to secure support post 10 against axial movements relative to body element, but freely permit relative rotational movements of body element 20 around support post 10.

To prevent leakage of lubricant fluid from cylindrical chamber 20a, suitable seals are provided. A static O-ring seal 17b is provided between the periphery of locking member 17 and the top inner wall of cylindrical chamber 20a To prevent leakage along support shaft 10, a packing type dynamic seal 19 is provided between the bore of annular locking member 17 and the upper external surface 10f of support post 10.

An annular dust cap 30 covers the top end of body element 20 and is conventionally secured thereto. If the frame element 5, to which support post 10 is secured, has a horizontal downwardly facing surface 5a, dust cap 30 may be eliminated by tightening nuts 6 to bring the top surface of body element 20 into engagement with frame surface 5a.

From the foregoing description, it will be readily apparent that vertical load forces imposed on support post 10 by the frame 5 of the wheel supported carrier are transmitted to body element 20 solely through a ball type thrust bearing, and therefore do not significantly increase the resistance to swiveling of the caster wheel. Additionally, the size of the load imposed on the caster wheel does not affect the anti-shimmying resistance provided by the viscous fluid shearing forces existing between vertically stacked washers 21 and 22.

Those skilled in the art will recognize that the reduced diameter portion of chamber 20a could house the anti-friction, thrust bearings and the discs or washers 21 and 22 would then be relocated above the bearings if desired.

I claim:

1. A caster wheel mounting for a wheeled load carrier having a frame comprising, in combination:

a caster wheel mounting rod securable to said frame in depending relation;

a body element having a cylindrical chamber surrounding a lower portion of said mounting rod in concentric relation;

said cylindrical chamber having a closed bottom and an open top;

means connecting to at least one of said rod and said body element for securing said rod to said body element against relative axial movements, but freely permitting relative rotational movements of said rod and said body element;

bracket means on said body element for supporting a caster wheel for rotation about a horizontal axis;

a plurality of washers mounted in said cylindrical chamber in vertically stacked, abutting relationship;

all of said washers having a central aperture vertically traversed by an end portion of said lower portion of said rod;

alternate ones of said vertically stacked washers being attached to and co-rotatable with said body element about the axis of said rod;

the remainder of said vertically stacked washers being fixed against rotation relative to said rod but freely rotatable relative to said body element;

lubricating fluid filling said cylindrical chamber to a depth covering all of the abutting surfaces of said vertically stacked washers, whereby shimmying movements of the caster wheel is opposed by the viscous fluid shearing forces generated between the lubricated abutting surfaces of said vertically stacked washers; and means for sealing said cylindrical chamber to prevent loss of said lubricating fluid.

2. The caster wheel mounting of claim 1 wherein the inner surface of said cylindrical chamber has a reduced diameter portion having a plurality of peripherally spaced vertical grooves formed therein;

said alternate ones of said vertically stacked washers having a plurality of peripherally spaced, radial projections respectively engagable with said vertical grooves to make said alternate ones of said vertically stacked washers co-rotatable with said body element.

3. The caster wheel mounting of claim 2 wherein said alternate ones of said vertically stacked washers have central apertures sized to freely surround said rod.

4. The caster wheel mounting of claim 1 wherein the end portion of said rod traversing said vertically stacked washers has a non-circular cross-section; and said remainder of said vertically stacked washers having non-circular central apertures conforming to said non-circular cross-section of said portion of said rod, thereby securing said remainder of said vertically stacked washers against rotation with respect to said rod.

5. The caster wheel mounting of claim 1 wherein said cylindrical chamber has a closed bottom and an open top to permit insertion of said support rod therein;

a reduced diameter portion adjacent said closed bottom, thereby defining an upwardly facing annular shoulder;

said vertical stack of washers being disposed on said bottom of said cylindrical chamber adjacent said reduced diameter portion;

a radially projecting flange on said support rod located above the top of said vertical stack of washers;

annular thrust bearing means disposed intermediate said radial flange and said top of said annular shoulder;

said annular thrust bearing means being vertically supported by said annular shoulder, thereby preventing the application of any compressive forces to said vertical stack of washers.

6. The caster wheel mounting of claim 1 wherein said cylindrical chamber has a peripherally extending inner reduced diameter portion extending from the bottom of said cylindrical chamber to a position slightly above the top of said vertical stack of washers;

said inner surface of said inner reduced diameter end portion having a plurality of peripherally spaced vertical grooves formed therein;

said alternate ones of said vertically stacked washers having a plurality of peripherally spaced, radial projections formed thereon respectively engagable with said vertical grooves to make said alternate ones of said vertically stacked washers co-rotatable with said body element;

a radial flange on said rod at a position spaced above the top of said vertical stack of washers; and anti-friction thrust bearing means disposed between a bottom surface of said radial flange on said rod and a top surface of said inner reduced diameter portion in said cylindrical chamber, thereby isolating said vertical stack of washers from the application of vertical compressive forces.

7. The apparatus of claim 6 wherein said anti-friction thrust bearing means comprises a ball groove formed in a bottom surface of said radial flange of said rod;

a cooperating annular ball groove formed in a top surface of said inner reduced diameter portion of said cylindrical chamber; and a plurality of ball bearings mounted in said cooperating ball grooves.

8. A caster wheel mounting of claim 1 wherein said means for securing said mounting rod to said body element comprises an upwardly facing angular shoulder in said cylindrical chamber;

an annular anti friction, thrust bearing surrounding said mounting rod and supported by said upwardly facing annular shoulder;

a radial flange on said mounting rod having upwardly and downwardly facing surfaces, said downwardly facing surface overlying and abutting said annular anti friction bearing; and means cooperating with said upwardly facing flange surface for preventing upward movement of said support rod relative to said body element;

whereby load forces on said mounting rod are transmitted to said body element solely through said annular anti friction thrust bearing.

9. The caster wheel mounting of claim 8 wherein said means cooperating with said upwardly facing surface comprises:

a second annular anti-friction thrust bearing having a second ring of bearing balls overlying and abutting said upwardly facing surface of said support rod flange;

an annular locking member overlying and abutting said second anti-friction bearing; and means for detachably securing said annular locking member against upward movements relative to said body element.

10. A caster wheel mounting for a wheeled load carrier having a frame comprising, in combination;

a caster wheel mounting rod rigidly securable to said frame in depending relation, the lower end of said rod being of non-circular cross-section and the medial portion of said rod having a radially enlarged peripheral flange;

a body element having a closed bottom, open top cylindrical chamber, the lower portions of cylindrical chamber having a reduced diameter internal peripheral wall defining an upwardly facing shoulder and a plurality of peripherally spaced vertical grooves formed in said reduced diameter internal wall;

bracket means on said body element defining a horizontal axis rotatable mounting for a caster wheel;

an annular ball race assembly abutting said upwardly facing shoulder and containing a plurality of ball bearings said peripheral flange having a lower surface rotatably supported on said plurality of ball bearings, said assembly defining an anti-friction thrust bearing to resist downward forces on said rod;

a plurality of vertically stacked washers mounted in said cylindrical chamber vertically adjacent to said reduced diameter internal wall;

said washers having central apertures traversed by said lower end of said rod;

the top washer being located below said upwardly facing shoulder;

alternative ones of said vertically stacked washers having circular central apertures traversed by said lower end of said rod, the remainder of said vertically stacked washers having non-circular central apertures conforming to said non-circular cross-section of said lower end of said rod;

said alternate ones of said vertically stacked washers having peripherally spaced, radial projections respectively engagable with said vertical grooves in said reduced diameter internal wall;

a lubricating fluid filing said cylindrical chamber to a depth covering all abutting surfaces of said vertically stacked washers; and closure means for said open top of said cylindrical chamber sealably cooperating with said body element and said mounting rod preventing movement of said rod out of said cylindrical chamber.

11. The caster wheel mounting of claim 10 wherein said closure means comprises;

a second annular ball race assembly insertable in said cylindrical chamber above said flange and abutting said flange, thereby defining an anti-friction thrust bearing for upward forces imposed on said body elements; and an annular locking member detachably secured to said body element and abutting said second annular ball race to prevent movement of said rod outwardly relative to said cylindrical chamber.

12. The caster wheel mounting of claim 11 wherein said closure means further comprises;

a first annular seal between said second ball race assembly and the wall of said cylindrical chamber; and a second annular seal between said annular locking member and said mounting rod.

13. The caster wheel mounting of claim 10 wherein said bracket means is integral with said body element.

14. The caster wheel mounting of claim 10 wherein said body element has a planar external bottom surface;

said bracket means comprises a bracket having a planar mounting portion abuttable with said planar external bottom surface of said body element and detachably secured thereto; and an arm portion projecting from said mounting portion for mounting a caster wheel for rotation about a horizontal axis.

15. The caster wheel mounting of claim 10 wherein said body element has a planar external bottom surface; and said bracket means comprises a U-shaped member having spaced arm portions and a planar bight portion abuttable with said planar external bottom surface of said body element and detachably secured thereto; the arm portions of said U-shaped member constructed and arranged for mounting a caster wheel for rotation about a horizontal axis.

16. A caster wheel mounting for a wheeled load carrier having a frame, comprising, in combination:

a caster wheel mounting rod rigidly securable to said frame in depending relation;

a body element having a closed bottom, open top cylindrical chamber concentrically surrounding the lower portions of said mounting rod;

bracket means on said body element for supporting a caster wheel for rotation about a horizontal axis;

an inwardly projecting peripheral wall in the lower portions of said cylindrical chamber defining an upwardly facing annular surface;

a plurality of washers mounted in said inwardly projecting peripheral wall in vertically stacked relation, the height of said stack being no higher than said upwardly facing annular surface;

a radial flange on said mounting rod positioned above said upwardly facing annular surface and having upwardly and downwardly facing surfaces;

a thrust bearing positioned between said annular surface of said inner peripheral wall and said downwardly facing surface of said radial flange, whereby downward forces on said mounting rod are transmitted through said thrust bearing to said body element without compressing said vertically stacked washers;

all of said washers having central apertures vertically traversed by the lower end portions of said mounting rod;

alternate ones of said vertically stacked washers being attached to and co-rotatable with said body element about the axis of said mounting rod;

the remainder of said vertically stacked washers being fixed against rotation relative to said mounting rod but freely rotatable relative to said body element;

lubricating fluid filling said cylindrical chamber to a depth covering all of the abutting surfaces of said vertically stacked washers, whereby shimmying movements of the caster wheel is opposed by the viscous fluid shearing forces generated between the lubricated abutting surfaces of said vertically stacked washers;

means for sealing the open top end of said cylindrical chamber to prevent loss of said lubricating fluid; and means cooperating with said upwardly facing surface of said flange for preventing upward movement of said mounting rod relative to said body element.

* * * * *